April 29, 1924.

J. E. GRANGER 1,492,166

ELECTRODE AND ELECTRODE HOLDER FOR ELECTRIC ARC WELDING

Filed Oct. 10, 1922

Inventor:
Joseph E. Granger,
by: Bradbury & Caswell,
Attorneys.

Patented Apr. 29, 1924.

1,492,166

UNITED STATES PATENT OFFICE.

JOSEPH E. GRANGER, OF ALHAMBRA, CALIFORNIA.

ELECTRODE AND ELECTRODE HOLDER FOR ELECTRIC-ARC WELDING.

Application filed October 10, 1922. Serial No. 593,488.

*To all whom it may concern:*

Be it known that I, JOSEPH E. GRANGER, a citizen of the United States, residing at Alhambra, in the county of Los Angeles and State of California, have invented new and useful Improvements in Electrodes and Electrode Holders for Electric-Arc Welding, of which the following is a specification.

This invention relates to electrodes and electrode holders used for electric arc welding and more particularly although not exclusively provides an electrode and holder therefor which may be used with automatic and semi-automatic operating apparatus.
I have found that with existing automatic and semi-automatic welding apparatus that the mechanism employed to feed and guide the electrode in a straight line toward the weld is more or less complicated and not convenient for use, due principally to the holder and feeding and guiding mechanism being directly over or opposite the weld so that the electrode may be brought into a position approximately vertical to the surface of the weld. By the use of my invention that portion of the electrode which lies adjacent to the arc may be substantially vertical to and directly over the work although the feeding and guiding elements are at one side thus overcoming the objection above mentioned.

A further object is to provide a simple, inexpensive and effective electrode and electrode holder, which are compact in form, not liable to disorder and which enables the use of the greatest length of electrode within a given space.

With these and other objects and advantages in view my invention comprises the features of construction and combination of parts hereinafter described and claimed.

Figure 1:
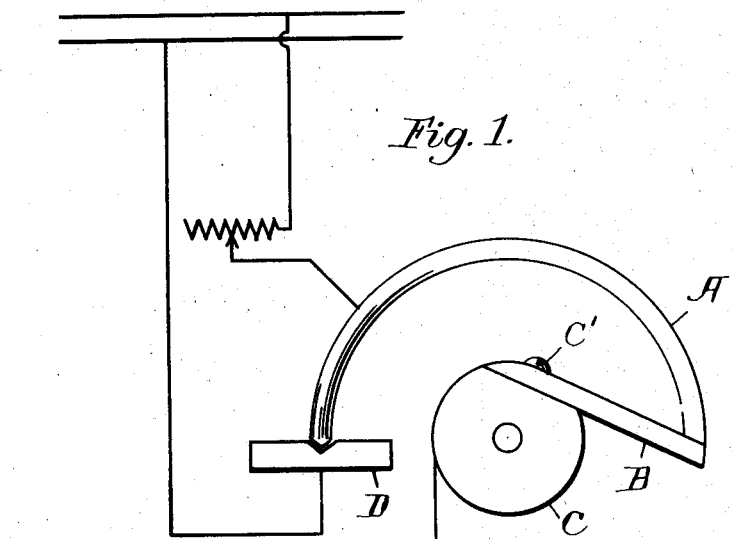
Figure 2:
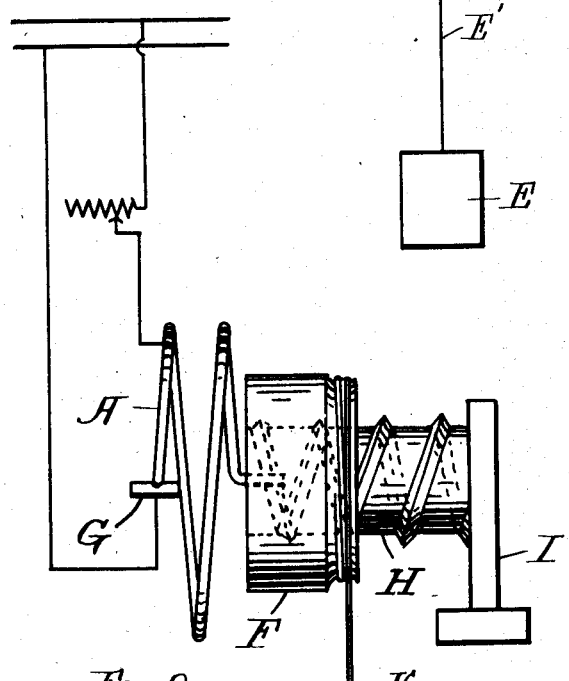

In the accompanying drawing forming part of this specification, Fig. 1 is a diagrammatic view illustrating my invention, the form of electrode shown being in a curve or segment of a circle, and Fig. 2 is another diagrammatic view illustrating another form of my invention, in which the curved electrode assumes spiral shape.
In the accompanying drawing forming part of this specification, A indicates my improved electrode which is curved from end to end and (see Fig. 1) conforms with an arc of a circle. One end of this electrode is mounted upon a support B, which in turn is detachably fastened by the screw C' to a spindle C. This spindle is co-axial with the electrode so that when turned on its axis in forward direction, the free end of the electrode is adapted to be fed evenly to its work D. The turning of the spindle may be produced by means of a weight E, attached to a cord E', which is secured to and wrapped around the spindle, or by any other suitable means desired, such means being so constructed as to maintain the end of the electrode and the work in proper spaced relation, but such means not forming the subject matter of the present invention, the same are not shown. The construction shown permits of arranging the feed mechanism at one side of the work while the electrode is being fed substantially vertically, which leaves a clearer view of the work by the operator. The curving of the electrode also enables a larger electrode to be used and more compact form of feed than heretofore.

When desired the electrode may be formed with more than one convolution (see Fig. 2), to increase its length, in which form it resembles a spiral or screw thread. By spiral I mean an electrode which is of curved form throughout its length and at the place where the arc is formed, in contradistinction to an electrode which is straight as it approaches the arc although it may be wound on a reel or the like before it is straightened to approach the work and in the use of the term "spiral" I mean it as above described. To feed this spiral form of electrode a longitudinal feed working in synchronism with the revolving movement of the spindle F is employed, whereby the free end of the electrode is fed to the work G, evenly and in substantially a vertical direction. The screw H, threaded into the spindle F and mounted rigidly upon the support I, performs the function of the longitudinal feed, while the spindle F is revolved by the weight J, which is secured to the spindle by the cord K, wrapped therearound. The spiral is arranged co-axially with and detachably mounted upon the spindle as in the construction shown in Fig. 1 and the pitch of the convolutions of the spiral and that of the threads on the screw H, correspond so that an even and steady feed of the electrode is produced.

The construction of Figure 2, just described, has been made the subject matter of a divisional application filed September 11, 1923, Ser. No. 662,061, electrodes and electrode holders.

While I have described a feed for moving the electrode towards its work it will be understood that the work may be fed towards the electrode while the electrode is being fed or being held stationary within the spirit of my invention. It will be understood that the invention contemplates any curved form of electrode designed to shorten the space within which a given length of electrode is held. It also contemplates the use of any suitable form of feed mechanism in co-operation with the electrode and work. It is to be understood, from the above description that in addition to the normal movement of the electrode towards the work as above described, the electrode may be moved longitudinally or otherwise with its spindle with respect to the work, or the work may be fed in any manner to obtain successful operation of the electrode, but the means therefor not forming the subject matter of the present invention the same are not shown. The invention further contemplates any suitable method for attaching the electrode to the feed mechanism and the use of an electrode of any desired size or radii and constructed of any suitable material.

Having described my invention, what I claim as new and desire to secure by Letters Patent is:

1. An electrode for electric arc welding formed in its entirety into the shape of a segment of a circle.

2. Welding apparatus including as an element an electrode formed into a segment of a circle and adapted to be adjusted at one end in juxtaposition to its work and a holder upon which said electrode is mounted adapted to vertically feed said electrode to its work by a turning movement of the electrode.

3. Welding apparatus including as an element an electrode curved concentrically about an axis, and adapted to be adjusted at one end in juxtaposition to its work by a turning movement about said axis.

4. Welding apparatus including as an element an electrode curved concentrically about an axis, and adapted to be adjusted at one end in juxtaposition to its work by a turning movement of said axis.

In witness whereof, I have signed my name to this specification.

JOSEPH E. GRANGER.